United States Patent Office 3,325,546
Patented June 13, 1967

3,325,546
PROCESS FOR THE PREPARATION OF DETERGENT PHOSPHINE OXIDES
Hugh R. Hays, Colerain Township, Hamilton County, Ohio, assignor to The Procter & Gamble Company, Cincinnati, Ohio, a corporation of Ohio
No Drawing. Filed Dec. 9, 1963, Ser. No. 329,251
6 Claims. (Cl. 260—606.5)

This invention relates to a process for the production of phosphine oxides in high yields. It relates especially to a process for the production of tertiary phosphine oxides useful for their detergent characteristics.

Certain tertiary phosphine oxides and their use as detergent substances are described in Belgian Patent 615,204. Production of these compounds efficiently in high yields is desirable.

In a recent article by K. Darrell Berlin and George B. Butler ("The Preparation and Properties of Tertiary and Secondary Phosphine Oxides," Chemical Reviews, 60, 3243–260 [June 1960]), several preparative techniques for tertiary phosphine oxides are set out. Also, G. M. Kosolapoff, in Organophosphorus Compounds (1950), presents a comprehensive review of techniques employed in the preparation of various phosphine oxides. However, most of these techniques have proved to be either uneconomical or undesirable for the production of detergent type phosphine oxides in high yields.

A particular difficulty which has been encountered in the preparation of phosphine oxides useful for their detergent characteristics is the tendency of these products to foam excessively in the reaction mixture. This foaming presents physical problems in carrying out the reaction as well as promoting entrapment of unreacted substances in the foaming product mass, making isolation of product difficult. Contributing factors to the tendency of detergent phosphine oxides to foam in reaction mixtures are the presence of polar solvents (e.g., water, alcohols) in the reaction medium and the necessity of carrying out the reaction at relatively high temperatures. Although foaming may be desirable in a finished detergent product, such a tendency represents a severe processing difficulty in a reaction system.

It is thus an object of this invention to provide a process for the production of detergent tertiary phosphine oxides in high yields.

It is a further object of this invention to provide a process for the production of detergent tertiary phosphine oxides at relatively low temperatures.

It is a particular object of this invention to provide a process for the production of detergent tertiary phosphine oxides which eliminates the problem of excessive product foaming in the reaction mixture.

The above objects are realized in the present invention by reacting with agitation a quaternary phosphonium compound of the formula

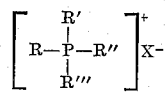

wherein R is an alkyl group containing from about 10 to 18 carbon atoms, R', R" and R''' are alkyl groups having from 1 to 3 carbon atoms at least one of which is a methyl group, and X is a methoxide, bicarbonate, or halide group, together with a base in a reaction system wherein the amount of water is insufficient to cause excessive foaming of the reaction product. The above "R" and "X" definitions apply hereinafter. The advantages realized by this process include a high product yield, freedom from necessity of using a solvent, minimization or elimination of undesired foaming in the reaction system, use of relatively low reaction temperatures, and ease in isolating the detergent tertiary phosphine oxide product.

It is thought that the reaction in the process of this invention proceeds as follows (where $Z^+$ is the cation of the base):

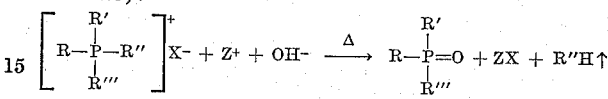

A methyl group is more easily removed from the phosphorous atom in this reaction than longer chain groups. Therefore in the above reaction R" represents the methyl group, and R"H is methane. However, the methyl group can be located at any of the "R" positions in the phosphonium compound and be subsequently removed from that position in the reaction.

If none of the "R's" in the quaternary phosphonium reactant is a methyl group, the maximum yield of long chain or detergent phosphine oxide is no higher than about 75%. For example, if R', R" and R''' were ethyl groups the reaction product would be approximately 75% diethyldodecylphosphine oxide and 25% triethylphosphine oxide.

Although, as mentioned, the quaternary phosphonium reactant can be one in which X is a methoxide, bicarbonate, or halide group, quaternary phosphonium compounds which have an X group which is $Cl^-$, $Br^-$, or $I^-$ are preferred in that they are readily available in more conveniently handled forms than some of the other compounds which can be used and they produce by-products in the process of this invention which are easily separated from the desired detergent phosphine oxide product. These quaternary compounds can be prepared by several techniques, one of the methods for their preparation being the quaternization of alkyl phosphines (e.g., dodecylphosphine, decylphosphine, hexadecylphosphine, octadecylphosphine) or trialkylphosphines (e.g., dodecyldimethylphosphine, diethylmethylphosphine, trimethylphosphine) with appropriate alkyl halides (e.g., dodecyl iodide, tetradecyl bromide, methyl chloride, methyl bromide, ethyl chloride). See Jerchel, Dietrich, Berichte der Deutschen Chemischen Gesellschaft 76A, 600–9 (1943).

The base used in the process of this invention can be selected from a wide variety of bases. It need only be a rather strong base which can furnish a hydroxyl ($OH^-$) ion. Therefore oxides, hydroxides, and $C_1$–$C_4$ alkoxides of alkali metals and alkaline earths, e.g., potassium hydroxide, sodium ethoxide, sodium methoxide, barium hydroxide, potassium t-butoxide, and potassium ethoxide, can all be used. Specific bases which have proved to be especially desirable for use in the process of this invention include, in addition to the bases listed above, sodium hydroxide, potassium methoxide, and calcium hydroxide. When oxides and alkoxides are used at least one equivalent weight of water must be present to produce the $OH^-$ ion necessary for reaction. Sodium hydroxide is preferred as a basic reactant because of its wide availability in many physical forms (e.g., pellets, granules) and relative low cost. Powdered anhydrous base is the preferred form for the basic reactant in the process of this invention, in that the reaction proceeds at low temperatures and with the least difficulty if no water is present. 76% sodium hydroxide is available in a flake form which melts readily on heating and is also suitable for use in this reaction. Sodium hydroxide which contains more than 40% by weight water reacts too slowly and tends to foam undesirably with the phosphine oxide detergent being produced in the reaction.

It is important to point out that even when the maximum allowable amount of water is present in the process of this invention (i.e., about 20% water by weight of the total reaction mixture) the reaction mixture still retains its substantially heterogeneous character. The presence of this level of water is insufficient to create a liquid reaction substrate. Heating and some melting of the reactants with agitation is still a precedent to reaction.

Although it is preferred that the reaction system be essentially water-free, small amounts of water can be tolerated in the process of this invention, i.e., not more than about 20% by weight of the reaction mixture. For processing reasons it is especially preferred that no more than 9% water be present in the mixture. In continuous processes some solvent in small amounts is usually desirable to impart fluidity to the reaction mixture. Such solvents include water and lower monohydric alcohols (e.g., $C_1$ to $C_4$ alcohols). Non-polar organic solvents can also be used if desired without detracting from the advantages of this invention but are not necessary. If the process is carried out in the presence of more than small amounts of water (e.g., more than 20% water by weight of the reaction mixture) the reaction requires a substantially longer time for completion and requires higher temperatures than otherwise (at least 15°–100° C. higher, dependent on the amount of water present). At these elevated temperatures there is also some danger that at least a portion of the product may be decomposed (decomposes at approximately 300° C.). Also, since the phosphine oxide detergent product tends to foam excessively in the presence of more than a small amount of water (and in the presence of polar solvents, such as ethanol), further treatment of the product (e.g., by-product removal and concentration) becomes increasingly difficult with larger amounts of water. At water concentrations higher than 20% by weight of the reaction mixture foaming in the reaction is excessive. The fact that methane is formed in the reaction also tends to increase the tendency to foam. The main function served by the presence of small amounts of water is to impart some fluidity to the reaction mixture in continuous processes. In batch techniques anhydrous base is preferred.

Several factors influence the temperature at which the process of this invention is carried out. The anion of the particular quaternary phosphonium compounds which is used in the process of this invention is one of the most important factors in determining the proper reaction temperature. By way of illustration, when X is chloride, the quaternary phosphonium salt will readily react with anhydrous bases at a temperature of 68° C. or higher. At temperatures of 80° C. and above bromide salts react readily with an anhydrous base. For iodide salts temperatures of at least 140° C. are required, temperatures of at least 115° C. when X is bicarbonate, and of at least 25° C. when X is methoxide. Reaction temperature is principally determined by the specific group which constitutes "X" and the amount of water present in the mixture. With any of these component groups present the reaction will proceed more rapidly at temperatures higher than those minimum reaction temperatures which have been set out above (e.g., up to 300° C., the approximate decomposition temperature of the detergent product). However, if some water is present foaming tendency of the reaction product becomes greater with increased temperatures, and it is therefore preferred that the reaction be carried out at approximately the stated minimum temperatures and up to or about 100° C. above such temperatures. In any event a reaction temperature below the decomposition temperature of the phosphine oxide detergent product, i.e., below about 300° C., must be used.

Heat can be applied to the mixture by conventional techniques, although if an open flame or open electric heating coil is used for heating care should be taken in removal of the volatile flammable gaseous product, methane, which accompanies formation of the detergent phosphine oxide product.

The techniques by which the reaction of the process of this invention can be carried out are not complex. One procedure involves merely powdering the reactants, intermixing them, and heating the reaction mixture. The reactants can be intermixed in their dry form, or can be mixed in the presence of a solvent to achieve more homogeneous intermixtures; solvent if present in large amounts is then preferably removed (e.g., by vacuum) prior to heating.

A slight molar excess (e.g., up to about 25%) of base is preferably used to assure complete reaction of the quaternary phosphonium compound. The mixture is heated to the appropriate reaction temperature and reaction is carried on until substantially all of the quaternary phosphonium reactant has been reacted. The time required for the reaction to be completed is directly related to the temperature at which the reaction is carried out. In a water-free system and at minimum reaction temperatures (set forth above) the reaction requires several minutes (e.g., 20 minutes), whereas at elevated temperatures the reaction can be completed in 1 to 5 minutes. If water is present the reaction requires higher temperatures and a longer time to go to completion.

The phosphine oxide product produced by the process of this invention is easily separated from the reaction mixture. One simple method for separating the desired phosphine oxide product from any excess base in the reaction mixture is by conventional distillation, vaccum distillation or steam distillation techniques. Since the detergent phosphine oxide tends to crystallize on cooling, separation can also be achieved by conventional recrystallization-filtration techniques. Extraction of the phosphine oxide from the reaction mixture with organic solvents, followed by removal of any solvent present is another means of separation. Other techniques will be apparent to those skilled in the chemical arts.

Yields as high as 90–99% of theory are obtainable. The phosphine oxide detergent product is especially useful when combined with other detergent ingredients and builders to form flake, granular, and liquid detergents of the type described in Belgian Patent 615,204, Yoke & Laughlin (Sept. 17, 1962).

A wide variety of apparatus is suitable for carrying out the process of this invention. For example, in carrying out batch processes an apparatus which consists basically of a reaction vessel equipped with an agitator, thermometer and gas trap for collection of methane is suitable. Heating of the mixture can be carried out behind a shield using an oil bath, or using any conventional heating means. Since flammable gases are formed in the reaction it is preferable for safety reasons to carry out the reaction in a closed system with appropriate means for removing the gaseous by-product. However, if adequate ventilation is used and open heating techniques are avoided, the process of this invention can be carried out without the requirement of a closed system. Agitation of the reaction mixture can be carried out with a magnetic stirrer, although violent stirring should not be used in order to minimize the possibility of foaming in the reaction mixture. Other suitable apparatus arrangements will be apparent to those skilled in the chemical arts.

If the reaction is carried out as a continuous process, e.g., using continuous introduction of reactants to, and flow through, a long reaction tube, the use of some solvent may be desired to maintain fluidity throughout the system. However, more than 20% solvent by weight of the reaction mixture should not be used if processing and separation difficulties are to be avoided. A desirable alternative to the use of solvent in continuous processes is to maintain the reaction temperature at a temperature above the melting point of the detergent phosphine oxide product (e.g., above about 84° C.), recycling a portion of the melted product to maintain a relatively fluid reaction system. Numerous methods for utilizing the process of this invention in continuous systems are apparent to those skilled in the chemical arts.

Applications of the above-described invention can be illustrated by use of the following examples. However, these examples are not intended to be limiting in any respect and variations will be apparent.

The apparatus used to carry out the reactions of the following examples consisted of a 100 ml. flask equipped with a magnetic stirrer, metallic thermometer, condenser, and a calibrated 2.5 liter gas trap.

*Example 1*

A mixture of 28 grams of crystalline dodecyltrimethylphosphonium chloride (0.11 mole) and 4.4 grams of powdered anhydrous sodium hydroxide (0.11 mole) was heated in a flask to a temperature of about 68° C., at which temperature reaction was observed to occur. Reaction was carried out with agitation until evolution of methane was no longer noted. The desired product, dimethyldodecylphosphine oxide (melting point 83°–84° C.), was isolated in 96% of the possible theoretical yield by distillation of the reaction mixture under reduced pressure.

Substantially analogous results are noted when phosphonium reactants such as decyltrimethylphosphonium chloride, hexadecyltrimethylphosphonium chloride, octadecyltrimethylphosphonium chloride, or ethyldodecyldimethylphosphonium chloride are reacted in a manner analogous to that in Example 1 with bases such as barium hydroxide, potassium hydroxide, calcium hydroxide, sodium methoxide, or potassium ethoxide to form the corresponding tertiary phosphine oxides.

*Example 2*

A mixture of 37 grams of crystalline dodecyltrimethylphosphonium iodide (0.1 mole) and 4.4 grams of powdered anhydrous sodium hydroxide (0.11 mole) was reacted with agitation using apparatus and techniques the same as those used in Example 1. However, reaction took place at about 140° C. and was maintained between 140° and 150° C. The phosphine oxide product (dimethyldodecylphosphine oxide) represented a yield of 97%.

When dodecyltrimethylphosphonium bicarbonate is reacted with anhydrous sodium hydroxide in a manner analogous to that in Example 2 at a temperature of 115° C., substantially the same results are obtained.

*Example 3*

A mixture of 32 grams of crystalline dodecyltrimethylphosphonium bromide (0.1 mole) and 4.4 grams of powdered anhydrous sodium hydroxide (0.11 mole) was reacted with agitation using the same apparatus and techniques as used in Example 1. The reaction started at 80° C. and was kept between 80° C. and 110° C. during the course of the reaction. A 93% yield of dimethyldodecylphosphine oxide was obtained.

*Example 4*

Twenty-eight grams of dodecyltrimethylphosphonium chloride (0.1 mole in 40 mls. of anhydrous methanol) and .1 mole potassium methoxide (4.0 g. of potassium in 80 mls. of anhydrous methanol) were reacted at 25° C. for approximately 20 minutes, using apparatus the same as that used in Example 1. The potassium chloride by-product precipitated and was removed by filtration and the methanol solvent was removed at 0° C. under .1 mm. pressure. The dodecyltrimethylphosphonium methoxide product was thermally stable up to 160° C. However, on addition of molar equivalent amount of anhydrous NaOH with agitation, the compound decomposed rapidly at 25° C. to form methanol, methane, and dimethyldodecylphosphine oxide in 94% of the theoretical yield.

In all of the foregoing examples (1–4) there was a distinct absence of foaming in the reaction mixture during the reaction and, as shown, very high yields of detergent phosphine oxides were produced.

*Example 5*

The following reaction mixture was prepared and heated in apparatus the same as that used in Example 1: a mixture of 14.0 grams (.05 mole) dodecyltrimethylphosphonium chloride and 3.3 grams of aqueous 60% NaOH (.05 mole) in a mushy solid form. (The reaction mixture therefore contained about 8% water by weight of the total composition.) This mixture was agitated and heated to 75° C. and reaction commenced. The reaction proceeded with agitation smoothly between 75°–80° C. with very little foaming. Dimethyldodecylphosphine oxide in 91% yield was isolated from the reaction mixture by distillation at .1 mm. pressure.

The phosphine oxide products prepared in the foregoing examples (1–5) are excellent detergent substances, exhibiting these desirable detergent characteristics in both hot and cold water fabric-laundering applications.

Although the present invention has been described and illustrated with reference to specific examples, it will be understood that modifications and variations can be made without departing from the spirit and scope of the invention as set forth in the following claims.

What is claimed is:

1. A process for the production of a detergent tertiary phosphine oxide, comprising the step of
   (1) reacting with agitation a quaternary phophonium salt of the formula

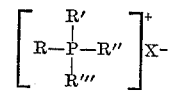

wherein R is an alkyl group ranging from 10 to 18 carbon atoms, R′, R″, and R‴ are alkyl groups having from 1 to 3 carbon atoms, at least one of which is a methyl group, and X is chloride, bromide, iodide, bicarbonate, or methoxide, together with a basic substance in a reaction system wherein the amount of water is not more than about 20% by weight of the reaction mixture present and is insufficient to cause excessive foaming of the reaction product, at a temperature of at least about 68° C. when X is chloride, of at least about 80° C. when X is bromide, of at least about 140° C. when X is iodide, of at least about 115° C. when X is bicarbonate, of at least about 25° C. when X is methoxide, but below the temperature of product decomposition.

2. The process of claim 1 in which no more than 9% water by weight of the reaction mixture is present in the reaction mixture.

3. A process for the production of a detergent tertiary phosphine oxide, comprising the step of reacting with agitation a quaternary phosphonium salt of the formula

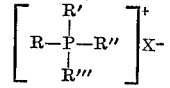

wherein R is an alkyl group ranging from 10 to 18 carbon atoms, R′, R″, and R‴ are alkyl groups having from 1 to 3 carbon atoms, at least one of which is a methyl group, and X is chloride, bromide, iodide, bicarbonate, or methoxide, together with a basic substance in a reaction system which is substantially anhydrous, at a temperature of at least about 68° C. when X is chloride, of at least about 80° C. when X is bromide, of at least 140° C. when X is iodide, of at least about 115° C. when X is bicarbonate, of at least about 25° C. when X is methoxide, but below the temperature of product decomposition.

4. The process of claim 3 in which the basic substance is sodium hydroxide.

5. The process of claim 3 in which the quaternary phosphonium salt is dodecyltrimethylphosphonium chloride.

6. The process of claim 3 in which the quaternary phosphonium salt is dodecyltrimethylphosphonium bromide.

References Cited

Houben-Weyl: "Methoden der Organischen Chemie," 4th ed., vol. XII/1, "Organische Phosphor-Verbindung" (1963), pp. 144 and 145.

TOBIAS E. LEVOW, *Primary Examiner.*

W. F. BELLAMY, *Assistant Examiner.*